US009108500B2

(12) United States Patent
Larsson et al.

(10) Patent No.: US 9,108,500 B2
(45) Date of Patent: Aug. 18, 2015

(54) COUPLING AND SYNCHRONIZING DEVICE FOR ELECTRIC DRIVE MODULES

(75) Inventors: Mikael Larsson, Nödinge (SE); Erik Sten, Trollhättan (SE); Hans-Martin Duringhof, RR Houten (NL); Gabriel Trönnberg, Trollhättan (SE); Mats Strandberg, Göteborg (SE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1367 days.

(21) Appl. No.: 12/688,397

(22) Filed: Jan. 15, 2010

(65) Prior Publication Data
US 2010/0263950 A1 Oct. 21, 2010

(30) Foreign Application Priority Data
Jan. 16, 2009 (GB) .................................. 0900701.4

(51) Int. Cl.
*F16D 23/02* (2006.01)
*B60K 6/387* (2007.10)
*F16D 43/04* (2006.01)
*B60K 6/48* (2007.10)
(Continued)

(52) U.S. Cl.
CPC . *B60K 6/387* (2013.01); *B60K 6/48* (2013.01); *B60K 6/52* (2013.01); *B60W 10/02* (2013.01); *B60W 10/06* (2013.01); *B60W 10/08* (2013.01); *B60W 20/00* (2013.01); *F16D 23/04* (2013.01); *F16D 43/04* (2013.01); *B60W 2520/10* (2013.01); *Y02T 10/6221* (2013.01); *Y02T 10/6265* (2013.01); *Y02T 10/6286* (2013.01)

(58) Field of Classification Search
CPC ...... B60K 6/387; B60W 10/02; B60W 10/08; F16D 43/04; F16D 43/24
See application file for complete search history.

(56) References Cited

U.S. PATENT DOCUMENTS 4,699,235 A * 10/1987 Anderson ..................... 180/247
4,883,138 A * 11/1989 Kameda et al. ............... 180/249
(Continued)

FOREIGN PATENT DOCUMENTS

| | | |
|---|---|---|
| FR | 2913225 A1 | 9/2008 |
| GB | 1435517 A | 5/1976 |
| WO | 2007131616 A2 | 11/2007 |

OTHER PUBLICATIONS

UK IPO, British Search Report for Application No. 0900701.4, dated May 14, 2009.
(Continued)

*Primary Examiner* — Huan Le
(74) *Attorney, Agent, or Firm* — Ingrassia Fisher & Lorenz PC

(57) ABSTRACT

A coupling device and a coupling mechanism is provided for selectively coupling of an electric drive to a wheel axle of a vehicle. The coupling device includes, but is not limited to an output gear connected to the wheel axle, an input gear connected to the electric motor. A synchronizer is adapted to contactlessly minimize a difference of the input gear's and the output gear's angular velocity below a predefined threshold, and a synchronizing member is adapted to frictionally engage with the input gear and/or with the output gear when the difference in angular velocity of input gear and output gear is below the predefined threshold.

18 Claims, 3 Drawing Sheets

(51) Int. Cl.
*B60K 6/52* (2007.10)
*B60W 10/02* (2006.01)
*B60W 10/06* (2006.01)
*B60W 10/08* (2006.01)
*B60W 20/00* (2006.01)
*F16D 23/04* (2006.01)

(56) References Cited

U.S. PATENT DOCUMENTS

| | | | |
|---|---|---|---|
| 7,125,357 B2 * | 10/2006 | Porter | 475/5 |
| 7,479,081 B2 * | 1/2009 | Holmes | 475/5 |
| 8,308,600 B2 * | 11/2012 | Rosemeier et al. | 475/204 |
| 2004/0163917 A1 * | 8/2004 | Hiraiwa | 192/53.34 |
| 2005/0115346 A1 * | 6/2005 | Sakamoto et al. | 74/335 |
| 2009/0098969 A1 * | 4/2009 | Tabata et al. | 475/5 |
| 2009/0197728 A1 * | 8/2009 | Janson | 475/5 |

OTHER PUBLICATIONS

UK IPO, British Examination Report for Application No. 0900701.4, dated Dec. 24, 2012.

* cited by examiner

COUPLING AND SYNCHRONIZING DEVICE FOR ELECTRIC DRIVE MODULES

CROSS-REFERENCE TO RELATED APPLICATION

This application claims priority to British Patent Application No. 0900701.4, filed Jan. 16, 2009, which is incorporated herein by reference in its entirety.

TECHNICAL FIELD

The present invention relates to a coupling and synchronizing device for an electric drive module, as it is for instance implemented in hybrid drives for vehicles.

BACKGROUND

Hybrid drives or hybrid vehicles typically comprise two different kinds of drives or engines. Hybrid vehicles, in particular passenger cars, typically make use of the combination of a combustion engine and an electric motor. The combustion engine and the electric motor are selectively and alternately coupled to the wheels of the vehicle.

Typically, in a lower speed regime, as for instance in city traffic, the vehicle might be exclusively driven by means of the electric motor, whereas the combustion engine may be the drive of choice for driving the vehicle in a higher velocity range.

Depending on the actual driving speed, the electric motor or the combustion engine have to be alternately coupled and decoupled to the wheels or to the power train of the vehicle. If the vehicle is driven by the combustion engine and moves at a relatively high velocity, it is particularly beneficial to disconnect or to decouple the electric motor from the wheels and/or a respective power train. Otherwise, the electric motor due to its intrinsic RPM-limit tends act as a brake.

Further, the mechanical coupling of the electric motor and associated wheels is otherwise unnecessarily stressed. Respective gears may induce friction losses, e.g. due to oil splash. Also the inertia of various rotating parts may otherwise decrease the driving efficiency of the entire vehicle.

As soon as a vehicle is driven in a lower velocity range, in which the electric motor has to be coupled and connected to the vehicle's wheels and wherein the combustion engine may be entirely disconnected or decoupled from respective wheels, the mechanical coupling of a non-rotating electric motor to a rotating wheel is rather elaborate and complex.

When making use of a conventional friction clutch for coupling of the electric motor with a rotating vehicle wheel, the clutch mechanism will be subject to extreme stress and mechanical wear and may be therefore quite susceptible to failure. It may thus require intensive maintenance on a short-term time scale.

It is therefore at least one object to provide an improved coupling and synchronizing device for selectively coupling of an electric drive to at least one wheel axle of a vehicle. The coupling and synchronizing device should provide a fast and reliable coupling and connecting of the electric motor and wheel axle. At the same time, the coupling and synchronizing should be easy to assemble and inexpensive to manufacture. In addition, other objects, desirable features, and characteristics will become apparent from the subsequent summary and detailed description, and the appended claims, taken in conjunction with the accompanying drawings and this background.

SUMMARY

The embodiments of the present invention provide a coupling device for selectively, in particular for non-permanently coupling of an electric drive to at least one wheel axle of a vehicle. The coupling device therefore comprises an output gear connected to the wheel axle and further comprises an input gear connected to the electric motor. Further, the coupling device comprises a synchronizing means, which is adapted to contactlessly minimize a difference of the input gear's and the output gear's angular velocity below a predefined threshold.

Additionally, the coupling device further comprises a synchronizing member, which is adapted to frictionally engage with the input gear and/or with the output gear, when the difference in angular velocity of the input gear and the output gear is below the predefined threshold.

The synchronizing means provides an effective approach to adjust and to match the output gear's and input gear's angular velocity, before the two gears of the coupling device are mechanically or frictionally coupled to each other. In this way, mechanical stress and wear can be remarkably reduced during a connecting or coupling procedure for connecting a disconnected electric motor to a vehicle's wheel axle.

In a typical application scenario, in which the electric drive has to be coupled and connected to a rotating wheel axle, in a first step, the synchronizing means serves to minimize the input and output gear's difference in angular velocity below a given threshold before said input and output gears become frictionally and/or mechanically coupled and connected by means of the synchronizing member.

The threshold in the difference between the angular velocity of the output and the input gear can be arbitrarily modified. The magnitude of the threshold may be adapted to given boundary conditions and other external user- or manufacturer-defined requirements. In scenarios, where the threshold tends to zero, i.e., where the output and input gear's angular velocity is almost equal before said gears become mechanically or frictionally engaged, mechanical stress and wear of the synchronizing member can be decreased to a minimum at the expense of a relative long time interval required to adjust input and output gear's angular velocity to the required threshold value.

By setting the threshold of angular velocity difference to a rather large value, the coupling and connecting of the electric drive with the rotating wheel axle will require less time. In this case, the synchronizing member is subjected to higher mechanical stress and wear.

The synchronizing member and the synchronizing means according to an embodiment of the present invention are coordinated and adjusted with respect to each other in order to provide a coupling and connecting of the electric drive to a rotating wheel, wherein the two counteracting parameters coupling time and mechanical stress are optimized.

In typical application scenarios, the synchronizing means is adapted to accelerate the input gear to a velocity, which is in the domain of the output gear's angular velocity. In preferable embodiments, the synchronizing means is adapted to reduce the difference of input gear's and output gear's angular velocity below approximately 20 percent, preferably below approximately 10 percent and most preferably below approximately 5 percent of the output gear's angular velocity. In this way, the synchronizing member only has to adjust and to compensate a respective angular velocity difference of at most 20, 10 or 5 percent of the output gear's angular velocity.

According to a first embodiment of the invention, the coupling device further comprises a synchronizing sleeve slidably disposed in axial direction, to selectively engage with the input gear, the output gear and/or the synchronizing member. The synchronizing sleeve provides a rigid mechanical coupling between output gear and input gear and thus between the electric drive and the wheel axle to be driven by the latter.

The synchronizing sleeve is adapted to operably engage with input gear and output gear as soon as input gear and output gear rotate at the same angular velocity, hence after a synchronizing process provided by the synchronizing means and the synchronizing member has been conducted and completed.

In a further embodiment, the synchronizing sleeve therefore comprises an internal gearing to engage with corresponding external teeth or spleens of input gear, output gear and/or synchronizing member. By axially shifting the synchronizing sleeve, input and output gear can be coupled to each other in a torque proof way.

In a further preferred embodiment, the synchronizing member frictionally engages with the output gear in response of the being axially shifted by means of the synchronizing sleeve. In this embodiment, the synchronizing sleeve is further coupled with an actuation means for selectively shifting the synchronizing sleeve along a gear shaft of the input and/or output gear.

Frictional engagement between output gear and synchronizing member can be achieved by a mutual axial displacement of synchronizing member and output gear. Preferably, the output gear is axially fixed and the synchronizing member is slidably disposed along the output gear's shaft. An axially sliding motion of the synchronizing member can further be conducted by the synchronizing sleeve.

As long as input gear and output gear are not synchronized and do not rotate at a matching angular velocity, by axially displacing the synchronizing sleeve towards the output gear, the synchronizing sleeve may frictionally abut against the synchronizing member, thus pushing the synchronizing member against the output gear, so that output gear and synchronizing member frictionally engage.

Additionally, also the synchronizing sleeve may frictionally engage in axial direction with the synchronizing member in order to adapt to the angular velocity of the output gear.

According to another preferred embodiment, the synchronizing member and the output gear comprise mutually corresponding cone-shaped or beveled friction surfaces. By making use of cone-shaped or beveled friction surfaces, the total friction surface between output gear and synchronizing member can be increased, almost irrespective of the diameter of the synchronizing member or output gear.

Further, by making use of cone-shaped or beveled friction surfaces, an axial thrust acting on the synchronizing member or output gear can be transmitted to the respective counterpart, output gear or synchronizing member in a well-defined way.

In a further preferred embodiment, the synchronizing member comprises a cone-shaped shaft to frictionally engage with a corresponding gear shaft of the output gear. Hence, the synchronizing member entirely surrounds the gear shaft of the output gear. In this way the gear shaft also serves as an axial guiding member for the synchronizing member.

In a further embodiment, the synchronizing member is adapted to adjust the angular velocity of the input gear to the angular velocity of the output gear. This angular velocity adjustment is of particular importance, especially when the electric drive has to be connected or coupled with the at least one wheel axle of the vehicle.

Correspondingly, the coupling device is further adapted to provide a decoupling between the electric drive and the output gear. Such a decoupling is preferably conducted, when the angular velocity of the output gear exceeds a predefined threshold.

Typically, this maximum threshold is determined by an angular velocity of the output gear, at which the electric drive becomes uneconomical or inefficient compared to the combustion engine of the vehicle. In preferred embodiments, this maximum threshold may be dynamically adapted according to the end users preferences.

In a further preferred embodiment, the electric drive of the vehicle itself provides the synchronizing means to contactlessly minimize a difference of the input gear's and output gear's angular velocity. For this purpose, before input and output gears are mechanically or frictionally coupled, the input gear is to be driven by the electric drive up to an angular velocity which is substantially equal or at least within a predefined range of the angular velocity of the output gear, before the synchronizing member frictionally engages with the output gear, and/or input gear.

According to this preferred embodiment, the electric drive fulfils a double function. On the one hand, it provides an auxiliary or exclusive drive mechanism to drive the vehicle, in particular in a low velocity-range. On the other hand, the electric drive or electric motor itself provides a synchronizing means to accelerate an input gear up to a velocity range, which substantially matches the angular velocity of an output gear, and which is connected to the wheel axle to be driven by the electric drive. This contactless and at least partial synchronization provided by the electric drive helps to minimize mechanical stress and to decrease mechanical wear of a friction clutch-like coupling and/or synchronizing device.

In preferred embodiments, the electric drive may further be controlled by means of at least one rotation sensor, adapted to determine the angular velocity of the output gear. Depending on a signal provided by such a rotation sensor, the electric drive may be powered to a corresponding, substantially matching angular velocity, such that a fast and smooth frictional coupling or synchronizing of input gear and output gear can be achieved.

In another aspect, the embodiments of the invention provide a method of selectively coupling of an electric drive to an output gear for driving at least one wheel axle of a vehicle. The output gear is connected to the wheel axle and an input gear is connected to the electric drive. For coupling of the input gear to a rotating output gear, the input gear is set in rotary motion by means of the electric drive before the input gear and the output gear are coupled by means of a synchronizing member, which in turn is adapted to frictionally engage with the output gear and/or with the input gear.

The method therefore provides a two step process for coupling an electric drive to a rotating wheel axle of a vehicle. In a first step, the angular velocity of an input gear, connected to the electric drive is adjusted to the angular velocity of an output gear of a coupling and synchronizing device. This adjustment in angular velocity can be conducted in a very rough but fast way, since a precise matching of angular velocities between input and output gear is finally provided by frictional engagement with the synchronizing member.

The respective mechanical and/or frictional engagement of input and output gear in order to mechanically couple the electric drive and the wheel axle is therefore done in a second step, after the difference in angular velocity of input and output gear has been decrease below a predefined threshold. In preferred embodiments, this threshold may be dynamically modified according to external conditions and requirements.

In typical embodiments, the input gear is accelerated to an angular velocity that differs at most approximately 20 percent, preferably approximately 10 percent and most preferably approximately 5 percent from the angular velocity of the output gear.

According to further embodiments, the angular velocity of the input gear is substantially adjusted to the angular velocity of the output gear by means of the electric drive before input gear and output gear are mechanically coupled by means of the synchronizing member, which is for instance designed as a synchronizing sleeve.

Whereas the synchronizing member provides a frictional engagement of input gear and output gear, the synchronizing sleeve further provides a positive rotational locking of input gear and output gear. Substantial adjustment of angular velocities of output gear and input gear has to be interpreted in a fairly broad sense. Deviations of approximately 5 percent, approximately 10 percent or even approximately 20 percent in angular velocity of output gear and input gear are still to be interpreted as substantially adjusted angular velocities in the scope of the present invention.

In a further embodiment, a control signal is generated, e.g., by means of a rotation sensor in order to provide a reference value up to which the input gear has to be accelerated by means of the electric drive before input and output gears are frictionally or mechanically coupled. The control signal can be provided by means of a rotation sensor coupled to the output gear or to the wheel axle.

In a further aspect, the invention provides a hybrid vehicle that comprises an engine and an electric drive, wherein the electric drive is selectively coupled to at least one wheel axle of the vehicle. This hybrid vehicle, which in typical embodiments comprises a combustion engine and an electric drive, further comprises a coupling and synchronizing device as described above. Furthermore, in preferred embodiments, the engine, e.g., a combustion engine, is coupled to the vehicle's front axle and the electric drive is coupled to the vehicle's rear axle.

Both drive mechanisms, the combustion engine as well as the electric drive are selectively and non-permanently coupled to respective axles, in order to drive the vehicle alternately either by means of the combustion engine or by means of the electric drive.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
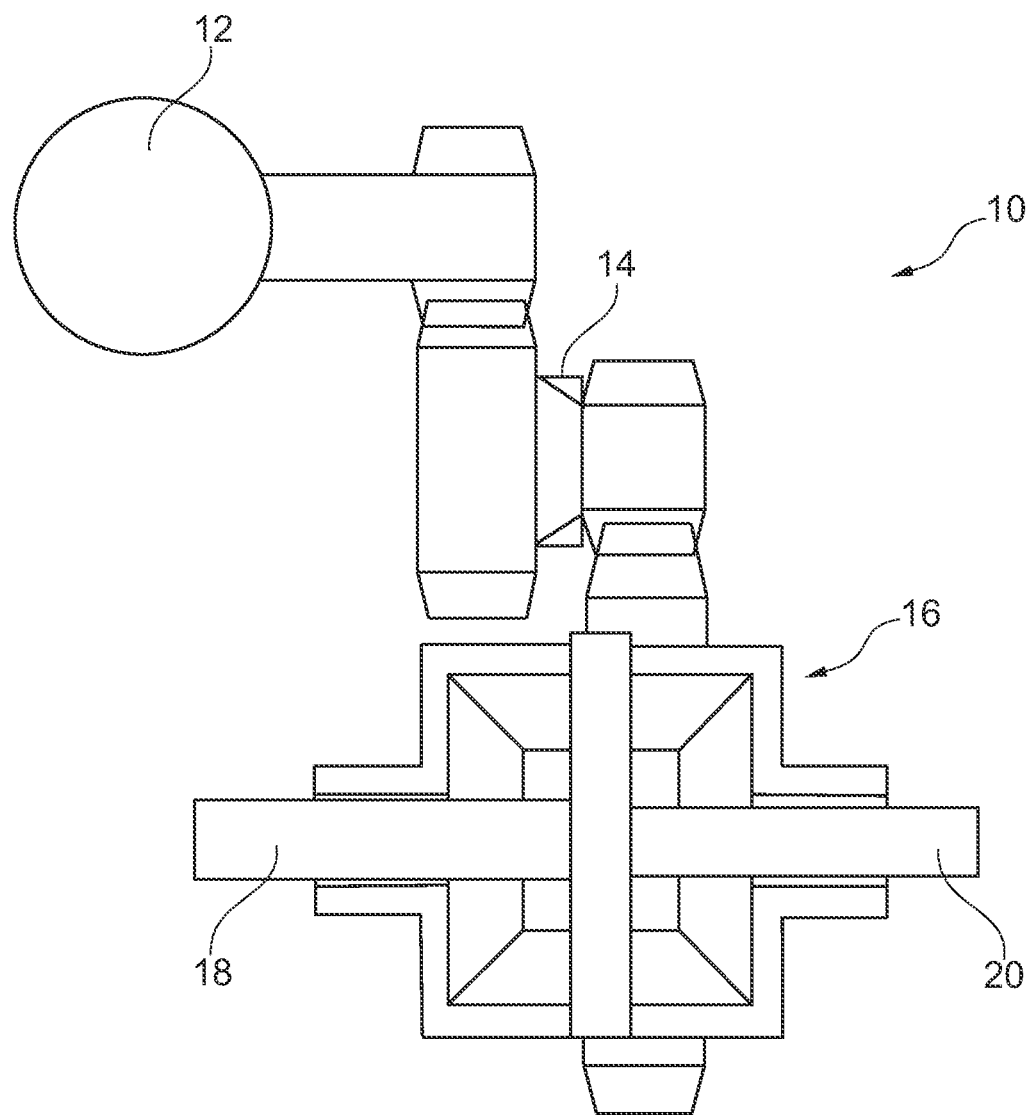
FIG. 1 schematically depicts the coupling of an electric motor to a vehicle's rear axis.

The coupling device 10 according to FIG. 1 provides a mechanical coupling between an electric drive lnposelstartlnlnposelendposelstart12lnposelend (also referred to as an electric motor) and a rear axle of a vehicle, illustrated by left drive shaft 18 and right drive shaft 20. The drive shafts 18, 20 are coupled by a differential 16, which in turn is to be driven by the electric drive 12 on demand.

In order to provide a selective and non-permanent coupling of the electric drive 12 and the drive shafts 18, 20 of the axle, the coupling device 10 is adapted to couple the electric drive 12 to the drive shafts 18, 20 only and exclusively in such conditions, in which an electric drive is economically reasonable. At larger vehicle velocities, the electric drive 12 may become inefficient compared to an additional, not explicitly illustrated, combustion engine of the vehicle.

Therefore, the electric drive 12 can be disconnected and decoupled from the differential 16 and respective drive shafts 18, 20. When the electric drive 12 has to be re-connected and coupled to the differential 16 and hence to the drive shafts 18, 20, the synchronizing unit 14 provides a fast, reliable and smooth coupling between the electric drive 12 and the rotating drive shafts 18, 20.

Figure 2:
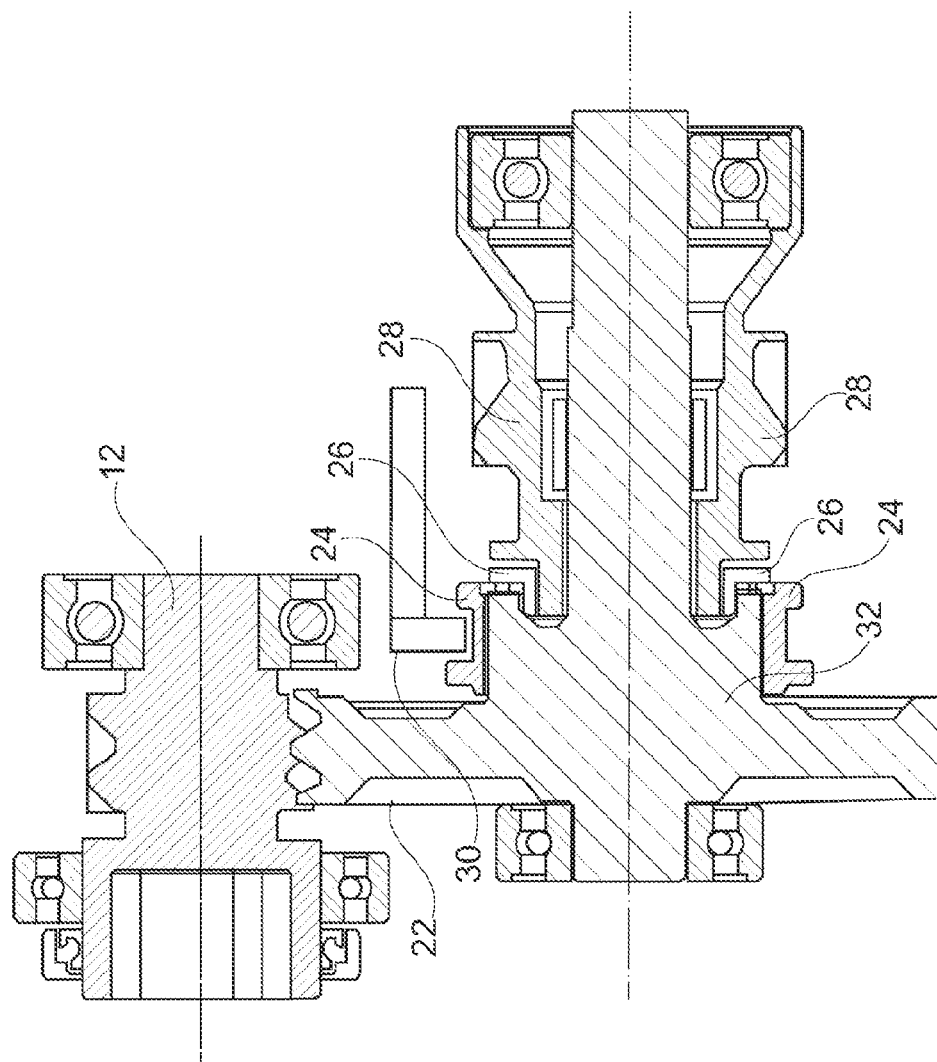
FIG. 2 depicts a preferred embodiment of the coupling mechanism in a cross-sectional illustration.
Figure 3:
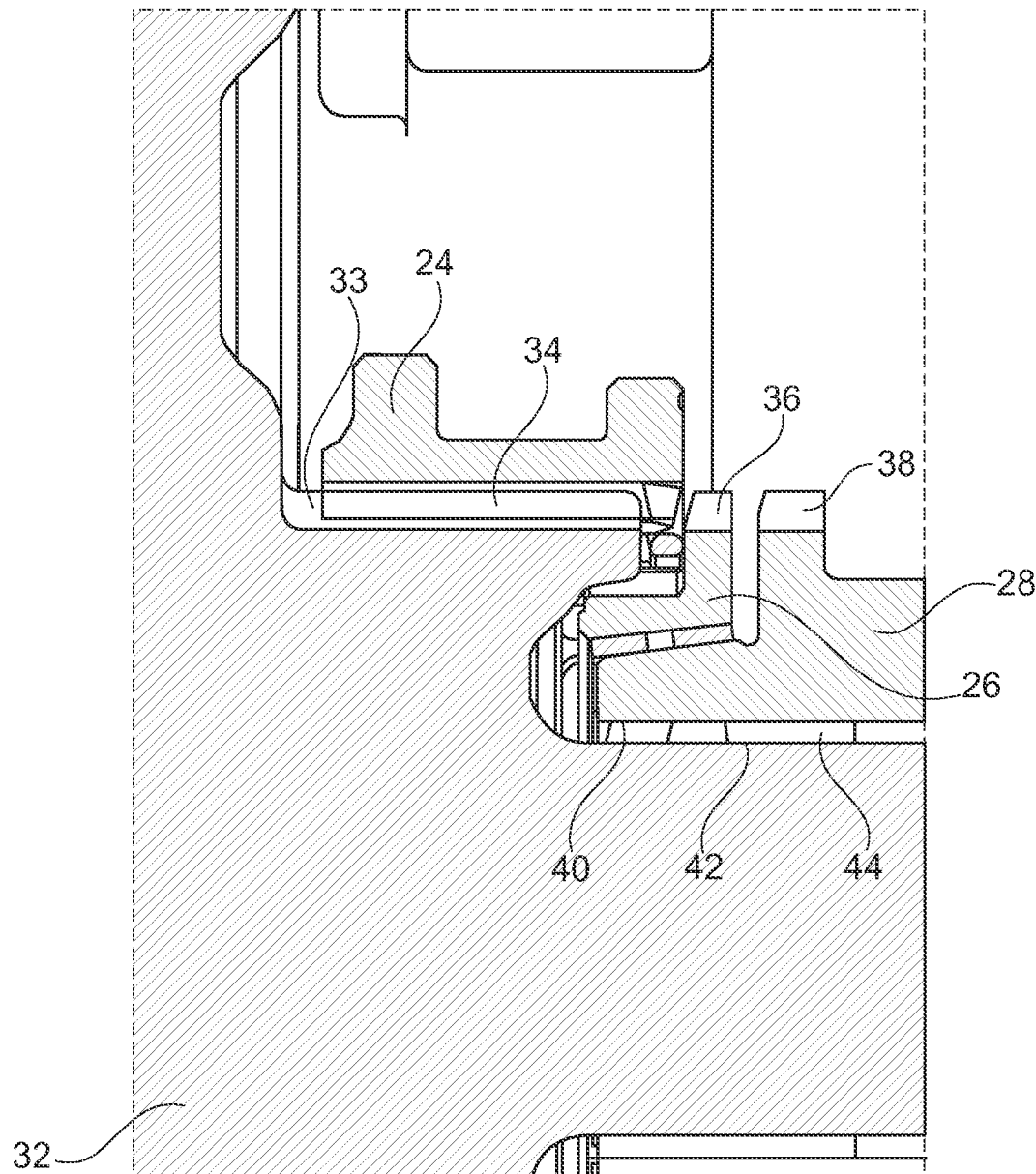
FIG. 3 shows the coupling mechanism of FIG. 2 in an enlarged view.

In FIG. 2 and FIG. 3, the internal structure of the synchronizing unit 14 is illustrated in detail. A drive shaft 22 coupled to the electric drive 12 serves as an input gear 32, whereas an output gear 28 is rigidly coupled and connected to the differential 16 and hence to the drive shafts 18, 20. Output gear 28 and input gear 32 are aligned coaxially and are arranged in an interlaced manner.

Output gear 28 for instance is arranged around an of input gear's 32 shaft. Between output gear 28 and input gear 32, there is arranged a synchronizing member 26, that has a flange-like or L-like shape, as can be seen in FIG. 4. The synchronizing member 26 is axially displaceable in order to frictionally engage with the output gear 28. For this purpose, the synchronizing member 26 and the output gear 28 have mutually corresponding cone-shaped or beveled friction surfaces 40, 42.

If for instance the synchronizing member 26 is axially shifted to the right in FIG. 3, its radially inwardly pointing friction surface 40 frictionally engages with a radially outwardly pointing friction surface 42 of the output gear 28. The synchronizing member 26 may further be frictionally or mechanically engaged with the input gear 32 and/or with the synchronizing sleeve 24. Between the corresponding friction surfaces of 40, 42 there is disposed a friction material, typically of resin bonded material. The friction material or friction surface 42 is fastened to either friction surface 40 or friction surface 42.

The general structure of the coupling and synchronizing device may resemble a dog clutch. The synchronizing sleeve 24, which is adapted to be axially shifted in for rigidly connecting output gear 28, synchronizing member 26 and input gear 32, is to be shifted in axial direction by means of a shift-fork 30. This shift-fork serves as an actuation means in order to activate and to control the frictional and/or mechanical coupling of electric drive 12 and output gear 28.

For this purpose, the synchronizing sleeve 24 has a radially inwardly pointing gearing 34, that matches with radially outwardly extending spleens 36 and 38 of synchronizing member 26 and output gear 28. An axial shifting of the synchronizing sleeve 24 for rigidly for rigidly connecting and coupling of output gear 28 and input gear 32 is enabled as soon as input gear 32 and output gear 28 rotate with the identical angular velocity.

In order to achieve the required synchronization, the embodiments of the invention suggest a two step synchronizing procedure. In a first step, the input gear's angular velocity is adjusted to the output gear's angular velocity within a certain range. This first synchronization is predominately exclusively conducted by the electric drive 12 itself.

As soon as the angular velocities of input gear 32 and output gear 28 are within the predefined margin, a synchronization of input gear 32 and output gear 28 can be achieved by means of the frictional engagement provided by the synchronizing member 26. As soon as angular velocities of output gear 28 and input gear 32 perfectly match, the synchronizing sleeve 24 can be axially displace by means of the shift-fork 30.

The angular velocity to which the input gear is to be accelerated by means of the electric drive 12 can be a fixed or dynamically varied, e.g., depending on the user's or manufacturer's demand. A synchronization procedure may be triggered by the overall velocity of the vehicle or by means of a driver's request, e.g., when the driver decides to switch in electric drive mode.

A corresponding acceleration of the input gear 32 can be governed by a rotation sensor coupled to the output gear 28. Making use of such a feedback mechanism, synchronizing and coupling of input gear 32 and output gear 28 can be conducted on a short time scale, even below 2 seconds or even below 1 second.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A coupling device for selectively coupling of an electric drive to a wheel axle of a vehicle, comprising:
   an output gear connected to the wheel axle, the output gear having a shaft;
   an input gear connected to the electric drive and having a shaft, the shaft of the output gear and the output gear arranged about the shaft of the input gear and coaxially aligned with the input gear; and
   a synchronizing member that frictionally engages with the output gear when the difference between a first angular velocity of the input gear and a second angular velocity of the output gear is below a predefined threshold, the synchronizing member arranged directly between the input gear and the output gear, the synchronizing member positioned about the shaft of the output gear and slidably disposed directly along the shaft of the output gear, the synchronizing member axially displaceable relative to the shaft of the output gear to frictionally engage the output gear.

2. The coupling device according to claim 1, wherein the synchronizing member and the output gear comprise mutually corresponding cone-shaped friction surfaces.

3. The coupling device according to claim 1, wherein the synchronizing member and the output gear comprise mutually corresponding beveled friction surfaces.

4. The coupling device according to claim 1, wherein the synchronizing member is adapted to adjust the first angular velocity of the input gear to the second angular velocity of the output gear.

5. The coupling device according to claim 1, wherein for engaging the output gear that is rotating with the input gear that is non-rotating, the input gear is to be driven by the electric drive up to an angular velocity being substantially equal to the angular velocity of the output gear before the synchronizing member frictionally engages with the output gear.

6. The coupling device according to claim 1, further comprising a synchronizing sleeve slidably disposed in an axial direction to selectively engage with at least one of the input gear, the output gear or the synchronizing member.

7. The coupling device according to claim 6, wherein the synchronizing sleeve comprises an internal gearing to engage with a corresponding external spleen of the output gear and the synchronizing member.

8. The coupling device according to claim 6, wherein the synchronizing member frictionally engages with the output gear in response of being axially shifted by the synchronizing sleeve.

9. A method of selectively coupling of an electric drive to an output gear for driving a wheel axle of a vehicle, comprising:
   connecting the output gear to the wheel axle, the output gear having a shaft;
   connecting an input gear to the electric drive, the input gear having a shaft, the shaft of the output gear and the output gear arranged about the shaft of the input gear and coaxially aligned with the input gear;
   setting the input gear in a rotary motion with the electric drive before the input gear and the output gear are coupled with a synchronizing member that frictionally engages with the output gear when the difference between a first angular velocity of the input gear and a second angular velocity of the output gear is below a predefined threshold, the synchronizing member arranged directly between the input gear and the output gear, the synchronizing member positioned about the shaft of the output gear and slidably disposed directly along the shaft of the output gear, the synchronizing member axially displaceable relative to the shaft of the output gear to frictionally engage the output gear.

10. The method according to claim 9, further comprising substantially adjusting the first angular velocity of the input gear to the second angular velocity of the output gear with the electric drive before the input gear and the output gear are mechanically coupled by at least one of the synchronizing member or a synchronizing sleeve.

11. The method according to claim 9, wherein for adjusting angular velocities of the input gear and the output gear, a control signal for the electric drive is generated in dependence of the second angular velocity of the output gear.

12. A hybrid vehicle, comprising:
   an engine;
   an electric drive having an output shaft; and
   at least one wheel axle,
   wherein the electric drive is selectively coupled to the at least one wheel axle with a coupling device, the coupling device comprising:
      an output gear connected to the at least one wheel axle, the output gear having a shaft;
      an input gear connected to the output shaft of the electric drive and having a shaft, the shaft of the output gear and the output gear arranged about a portion of the shaft of the input gear and coaxially aligned with the input gear; and
      a synchronizing sleeve positioned about a portion of the input gear, the synchronizing sleeve axially displaceable relative to the input gear to engage a synchronizing member;

the synchronizing member that frictionally engages with the output gear when the difference between a first angular velocity of the input gear and a second angular velocity of the output gear is below the predefined threshold, the synchronizing member arranged directly between the input gear and the output gear, the synchronizing member positioned about the shaft of the output gear and slidably disposed directly along the shaft of the output gear, the synchronizing member axially displaceable relative to the shaft of the output gear to frictionally engage the output gear, wherein to engage the output gear that is rotating with the input gear that is non-rotating, the input gear is driven by the electric drive up to an angular velocity substantially equal to the angular velocity of the output gear before the synchronizing member frictionally engages with the output gear.

13. The hybrid vehicle according to claim 12, wherein the synchronizing sleeve comprises an internal gearing to engage with a corresponding external spleen of the output gear and the synchronizing member.

14. The hybrid vehicle according to claim 12, wherein the synchronizing member frictionally engages with the output gear in response of being axially shifted by the synchronizing sleeve.

15. The hybrid vehicle according to claim 12, wherein the synchronizing member and the output gear comprise mutually corresponding cone-shaped friction surfaces.

16. The hybrid vehicle according to claim 12, wherein the synchronizing member and the output gear comprise mutually corresponding beveled friction surfaces.

17. The hybrid vehicle according to claim 12, wherein the synchronizing member is adapted to adjust the first angular velocity of the input gear to the second angular velocity of the output gear.

18. The hybrid vehicle according to claim 12, wherein the engine is non-permanently coupled to a front axle of the hybrid vehicle and wherein the electric drive is coupled to a rear axle of the hybrid vehicle.

* * * * *